US008176880B2

(12) United States Patent
Hurwitz

(10) Patent No.: US 8,176,880 B2
(45) Date of Patent: May 15, 2012

(54) THERAPEUTIC PET BOOT

(75) Inventor: Marni Markell Hurwitz, Far Hills, NJ (US)

(73) Assignee: I DID iT, Inc., Far Hills, NJ (US)

( * ) Notice: Subject to any disclaimer, the term of this patent is extended or adjusted under 35 U.S.C. 154(b) by 122 days.

(21) Appl. No.: 12/583,550

(22) Filed: Aug. 21, 2009

(65) Prior Publication Data

US 2011/0041779 A1  Feb. 24, 2011

(51) Int. Cl.
*A43B 13/38* (2006.01)
*A61D 9/00* (2006.01)
*A01K 29/00* (2006.01)

(52) U.S. Cl. ................ 119/850; 36/111; 36/43
(58) Field of Classification Search .......... 119/850; 36/111, 71, 43, 140, 141, 153; 54/82
See application file for complete search history.

(56) References Cited

U.S. PATENT DOCUMENTS

| 3,747,565 | A | | 7/1973 | Kellam ........................... 54/82 |
| 3,762,073 | A | | 10/1973 | Cantales ........................ 36/111 |
| 4,458,431 | A | * | 7/1984 | Sinclair .......................... 36/88 |
| 4,744,333 | A | | 5/1988 | Taylor ......................... 119/850 |
| 5,148,657 | A | | 9/1992 | Stafford et al. ................... 54/82 |
| 5,408,812 | A | | 4/1995 | Stark ................................ 54/82 |
| 5,495,828 | A | | 3/1996 | Solomon et al. .............. 119/850 |
| 5,551,173 | A | * | 9/1996 | Chambers ........................ 36/44 |
| 6,305,328 | B1 | * | 10/2001 | Marquis ........................ 119/850 |
| 6,526,920 | B1 | * | 3/2003 | Griffin .......................... 119/850 |
| 6,598,319 | B2 | | 7/2003 | Hardt ............................... 36/28 |
| 6,598,321 | B2 | | 7/2003 | Crane et al. ...................... 36/43 |
| 6,631,568 | B2 | | 10/2003 | Howlett et al. ................... 36/43 |
| 6,810,603 | B1 | * | 11/2004 | Cosentino ........................ 36/8.3 |
| 7,140,126 | B2 | | 11/2006 | Crane et al. ....................... 36/43 |
| RE40,363 | E | * | 6/2008 | Grim et al. ........................ 36/88 |
| 7,506,459 | B2 | * | 3/2009 | Grisoni et al. .................... 36/71 |
| 7,726,044 | B2 | * | 6/2010 | Gray ................................ 36/93 |
| 2003/0097768 | A1 | * | 5/2003 | Baek ................................ 36/55 |
| 2004/0073281 | A1 | * | 4/2004 | Caselnova .................... 607/111 |
| 2005/0039349 | A1 | * | 2/2005 | Grisoni et al. .................... 36/71 |
| 2005/0092260 | A1 | * | 5/2005 | Paxton et al. ................. 119/850 |
| 2006/0026868 | A1 | * | 2/2006 | Grisoni et al. .................... 36/71 |
| 2006/0037561 | A1 | * | 2/2006 | Fine .............................. 119/850 |
| 2007/0039565 | A1 | * | 2/2007 | Krottinger ..................... 119/850 |
| 2007/0044734 | A1 | * | 3/2007 | Maloney et al. ............... 119/850 |
| 2008/0271340 | A1 | * | 11/2008 | Grisoni et al. .................... 36/43 |
| 2010/0050322 | A1 | * | 3/2010 | Zagula ............................ 2/239 |
| 2010/0175275 | A1 | * | 7/2010 | Beiruti ............................. 36/44 |
| 2011/0041780 | A1 | * | 2/2011 | Hurwitz ........................ 119/850 |

* cited by examiner

*Primary Examiner* — Yvonne R. Abbott
(74) *Attorney, Agent, or Firm* — Ernest D. Buff; Ernest D. Buff & Assoc. LLC; Margaret A. LaCroix

(57) ABSTRACT

A pet boot having therapeutic properties is worn on a pet's injured or sensitive paw to facilitate healing and or provide protection. The therapeutic pet boot includes an external boot member having a shaft and a paw portion constructed to form a cavity integrated therein appointed to receive an injured paw of a pet. The therapeutic pet boot further includes an internal therapeutic member appointed to be received within the cavity of the external boot member and is appointed to intimately contact the injured paw. The therapeutic pet boot is appointed to be worn on the injured paw of the pet to facilitate healing. The internal therapeutic member may comprise a gel bootee having a massaging gel sole or may comprise a gel inner layer or gel insole. Advantageously, the internal therapeutic member may directly deliver medicament to the paw and/or provide cold treatment or hot treatment therapies to the paw, while providing cushioning, shock absorption and protection from dirt and debris.

32 Claims, 9 Drawing Sheets

THERAPEUTIC PET BOOT

BACKGROUND OF THE INVENTION

1. Field of the Invention

The present invention relates to a therapeutic pet boot; and more particularly to a pet boot having therapeutic properties provided by a gel bootee insert with a gel inner layer or a massaging gel insole insert with healing properties, the boot and insert being appointed to be used on an animal when its paw is injured, sensitive and/or in need of cushioning and protection from dirt and shock absorption, during healing.

2. Description of the Prior Art

Injury to a pet animal's paw, including dogs and cats, requires a proper healing environment. Healing of injured paws can be frustrated due to overuse of the leg/paw, licking, scratching or biting by the pet, and/or contact with dirt or debris. Infection is also a concern during the healing process. While bandages have are frequently used they do not provide optimal protection, are easily compromised and do not generally provide therapeutic properties integrated therein. Bandages used to wrap an injured paw need to be replaced often and do not provide optimal protection as they absorb moisture, do not provide a shock absorbent nature, readily become dirty and are commonly chewed on by the pet. What is more, no therapeutic boot or shoe has been proposed which covers an injured paw to cushion it, protect it from shock and meddling by the pet, prevent entry of dirt, and promote a sanitary healing environment with therapeutic properties to facilitate healing.

While prior art has addressed shoes and/boots for animals for wear outside during inclement or cold weather, as well as for aesthetic purposes, no boot or shoe has been proposed that provides therapeutic properties being appointed to be worn by the pet to facilitate healing of an injured paw. Such prior art patents considered include: U.S. Pat. No. 4,458,431 to Sinclair (protective boot for pet animals has a sole member and a flexible upper); U.S. Pat. No. 5,495,828 to Solomon, et al. (pet animal boot including a pliable sleeve defining an open top end and a closed lower end, substantially conforms to the animal's paw and lower leg, contains an interior fabric liner, and is manufactured from a waterproof, non-slip, flexible and durable polymer solution); U.S. Pat. No. 4,744,333 to Taylor (protective footwear including a two-piece bootee comprises a sock of warm and comfortable yarn which is inserted into and joined to a boot of deerskin and suspender system); U.S. Pat. No. 3,762,073 to Cantales (disposable protective legging for a dog comprising a first and second sheet of flexible heat sealable thermoplastic material shaped to generally conform to the shape of a dog's leg); U.S. Pat. No. 3,747,565 to Kellam (pair of boots with means secured to the boots that extend along the leg and body portions of the animal to retain the boots on the paws); U.S. Pat. No. 5,408,812 to Stark (dog boot for use on a hunting dog having a lower paw-receiving portion of flexible, moisture-resistant material, and a generally tubular elongate legging portion extending upwardly); and U.S. Pat. No. 5,148,657 to Stafford et al. (dog boot having a foot, ankle and calf).

None of these boots and/or shoes provides therapeutic properties to an injured paw of a pet. Rather, these boots and/shoes are function and are structurally designed to be worn by the pet when outside in cold weather, or in heavy brush areas, in order to prevent injury to the paw that may result from cold, salt, deicing chemicals, or sharp sticks or thickets. These boots and/or shoes are not constructed and would not properly function to be therapeutic to an injured paw. They are merely preventative measures as against injury.

What is more, various insoles have been provided for human foot use, however these insoles are not constructed for a canine or feline (or other pawed pet) paws and do not provide an external pet boot in conjunction therewith. Canine and feline (or other paws) paw is distinctly structurally distinct from a human foot and accordingly these gel pad would need manipulation and reconstruction to perform as a paw bed for a pet. Examples of insoles for human feet can be found in U.S. Pat. No. 6,631,568 to Howlett, et al., U.S. Pat. Nos. 7,140,126 and 6,598,321 to Crane et al.; and U.S. Pat. No. 6,598,319 to Hardt.

In contrast to the efforts of prior art workers which heretofore have simply constructed pet boots and shoes to be worn by a pet when outdoors to prevent injury, there is a need in the art for a therapeutic pet boot appointed to be worn by a pet with an injured paw to facilitate healing. There remains a need in the art for a therapeutic pet boot that comprises a massaging gel sole and/or a gel inner layer to be worn by a pet when its paw is injured, sensitive and/or requires cushioning or protection from dirt and shock absorption, such as during healing.

SUMMARY OF THE INVENTION

The present invention provides a therapeutic pet boot appointed to be worn by a pet when its paw is injured, sensitive and/or necessitates cushioning, protection from dirt and shock absorption, such as during healing. Therapeutic properties are achieved by constructing a pet boot having an internal therapeutic member that intimately contacts and protects the sensitive or injured paw. Although the therapeutic pet boot herein has particular applications geared toward use on an injured paw, the boot can be utilized on a sensitive paw or a paw in need of comfort, such as with an older dog. Controlled release of a medicament and/or a scent can be delivered through the therapeutic member which, in one embodiment, is constructed having at least one reservoir or a plurality of pockets/capsules appointed with at least one aperture that is appointed to release medicament upon pressure being applied to the inner therapeutic member. Application of pressure to the inner therapeutic member surface causes the reservoir or pockets to fracture and the medicament to release onto the local paw pad.

Generally stated, the therapeutic pet boot includes an external boot member having a shaft and a paw portion constructed to form a cavity integrated therein appointed to receive an injured paw of a pet. The therapeutic pet boot further includes an internal therapeutic member appointed to be received within the cavity of the external boot member and is appointed to intimately contact the injured paw. Healing of the paw is facilitated through wear of the therapeutic pet boot. Advantageously, the internal therapeutic member may directly deliver medicament to the paw and/or provide cold treatment or hot treatment therapies to the paw, while providing cushioning, shock absorption and protection from dirt and debris.

The internal therapeutic member is appointed to be removably housed within the external boot member so that it can be interchanged and/or adjusted depending on the treatment needed. Generally, the internal therapeutic member is constructed as either (i) a gel bootee which in turn may include a bootee gel insole; or (ii) a massaging gel insole. The gel bootee (and/or optional bootee insole) and/or the massaging gel insole are composed of a gel material that enhances comfort as well as provides support for the pet's paw, legs, and lower back. Massaging gel structures are utilized so that when the animal walks a massaging effect is created on the paw to promote blood circulation and increase the overall health and comfort of the pet as well aid healing. The gel bootee (and/or optional bootee insole) and/or the massaging gel insole is composed of a silicon or polymeric material preferably having a movable fluid paw bed/foot bed or a visco-elastic gel to provide shock absorption and consequently protection to the paw. Each of these items can be marketed together or sold separately as stand-alone products. An absorbent top cloth may be adhered to the upper surface of gel bootee (and/or optional bootee insole) and/or the massaging gel insole to absorb moisture from the paw and enhance comfort. The absorbent top cloth may be resilient foam that conforms to the paw pad of the pet when pressure is applied.

Paw pad/or paw beds (digital pads and metacarpal pad) of the gel bootee (and/or optional bootee insole) and/or the massaging gel insole are preferably formed having a bottom gel layer and a top gel layer secured by adhesive, RF welding, or any other appropriate means, and are composed of a fluid impermeable material. The bottom gel layer is preferably made from a non-foam elastomer such as the class of materials known as viscoelastic polymers or silicone gels, which show high levels of damping when tested by dynamic mechanical analysis performed in the range of −50° C. to 100° C. Mechanical properties of the gel have greater viscous than elastic and therefore the gel provides a high energy absorption. Gels that can be used according to the present invention are thermoplastic elastomers (elastomeric materials), such as materials made from many polymeric families, including but not limited to the Kraton family of styrene-olefin-rubber block copolymers, thermoplastic polyurethanes, thermoplastic poly olefins, polyamides, polyureas, polyesters and other polymer materials that reversibly soften as a function of temperature. The preferred elastomer is a Kraton block copolymer of styrene/ethylene-co-butylene/styrene or styrene/butadiene/styrene with mineral oil incorporated into the matrix as a plasticizer.

In accordance with another aspect of the invention, parallel, spaced apart wave pattern resilient walls may be formed within the gel bootee (and/or optional bootee insole) and/or the massaging gel insole. These resilient walls are spaced by sinusoidal grooves to from wave patterns on the paw bed or foot bed of the bootee or insole. Spacing between adjacent resilient walls may vary, and for example may be approximately 3 mm, which varies dependent upon the width of each wall, size of the paw pad/insole, and by changing the amplitude of the sinusoidal grooves. Pitch of the wave pattern may also be varied. Various gel insoles are currently sold in the market for human feet, such as those sold under the tradename Dr. Scholl's® (massaging gel insoles and inserts). These insole constructs may be applied to form the gel insoles herein. Gel insoles for human feet are differently shaped and configured than those for canine and feline paws and up until the time of the present invention herein no gel insole has been constructed or provided for a canine or feline paw. Uniquely, the subject invention herein addresses problems resultant from paw injury to canines and felines (as well as other pawed pets) and has found that use of the therapeutic pet boot herein facilitates healing through massaging gel action during recovery.

Alternative embodiments of the therapeutic pet boot provide an internal therapeutic member, which may be in the form of a gel bootee with or without a bootee insole or a massaging gel insole that is appointed to provide cold therapy to the paw. Preferably, cold therapy is achieved by way of the bootee, bootee gel insole or massaging gel insole being capable of being placed in a refrigerator or freezer to provide a cold insole or bootee for treatment of the injured paw. The gel insoles are constructed having a polymeric top and bottom layer adhered together to form a reservoir or pocket therein which receives and houses a non-toxic material, preferably hydroxyethyl cellulose (sold under the trade name Cellusize™) or vinyl-coated silica gel or a granular, vitreous, highly porous form of silica made synthetically from sodium silicate. Another type of gel insole ice pack which may be used concerns cold treatment resultant from an endothermic reaction of ammonium nitrate and water for quick cooling.

Warm/hot treatment may be provided by the therapeutic pet boot as well. In another embodiment, the therapeutic pet boot provides an internal therapeutic member, which may be in the form of a gel bootee with or without a bootee insole or a massaging gel insole that is appointed to provide warm therapy to the paw. Preferably, warm therapy is achieved by way of the bootee, bootee gel insole or massaging gel insole via a hot water bottle type warming gel insole or chemical heat insole pack. Preferably, hot water bottle type insoles are used where the insole is reusable and where safety is a concern.

Medicament can be directly delivered to the paw through use of the therapeutic pet boot. In this embodiment the therapeutic pet boot's internal member being constructed as a bootee with or without a gel insole or a massaging gel insole includes a reservoir housing medicament. Such medication can include a plethora of medicines or treatments, for example including anesthetizing substances, antiseptic or an ointment. Advantageously, topical delivery of the medicament or ointment is achieved in a manner wherein the dog or cat cannot lick the product. For dry or cracked paw pads a lotion or moisturizer may be delivered by way of the insole.

The reservoir housing the anesthetizing substances, antiseptic, ointment, or lotion, etc. may be a single reservoir or may be comprised of a plurality of reservoirs in the form of a plurality of pockets) or a plurality of capsules—that readily release the medicament, etc. to the paw as pressure is applied. The medicament, etc. may be released by the application of pressure to the external surface or external top layer of the insole. This application of pressure causes the reservoir, pockets or capsules to break, releasing the medicament, lotion, etc., housed therein. Due to the arrangement of the capsules within the insole, the medicament, etc. is released at the interface between the paw pad and top of the insole enabling the medicament to contact the paw. Disperse of the medicament is determined by its volume, viscosity and its surface tension. Since pockets contain larger volume of the scent, they can be spaced apart further based on the volume.

A method for treating an injured paw of a pet with a therapeutic pet boot is also provided. The method comprise the steps of (i) inserting an internal therapeutic member within an external boot member having a shaft and a paw portion constructed to form a cavity integrated therein; (ii) placing the injured paw of the pet into the external boot so that the injured paw comes into intimate contact with the internal therapeutic member; (iii) securing the external boot onto the injured paw; and (iv) wearing the therapeutic pet boot by the pet for a period of time to facilitate healing of the injured paw.

BRIEF DESCRIPTION OF THE DRAWING

The invention will be more fully understood and further advantages will become apparent when reference is had to the following detailed description of the preferred embodiments of the invention and the accompanying drawings, in which:

FIG. 10b is a cross-sectional view taken along line X-X in FIG. 10a;

DETAILED DESCRIPTION OF THE INVENTION

The present invention provides a pet boot having therapeutic properties including a gel bootee having a bootee gel insole and/or a massaging gel insole having healing properties that is appointed to be used on an animal when its paw is injured, sensitive and/or necessitates cushioning, protection from dirt and shock absorption, during healing. An external boot member is provided that is preferably weather resistant and composed of a fibrous, rubber, silicone, polymeric, leather, suede material or combinations thereof. Inside the external boot member is an internal therapeutic member, preferably removable, that is appointed to intimately contact an injured paw.

The internal therapeutic member may comprise (i) a gel bootee that is received within the external boot member, which gel bootee preferably in turn includes a massaging gel bootee insole (which may be removable from the gel bootee or integrated within the bootee) or (ii) a gel inner layer or massaging gel insole that is received within the external boot member. Alternatively, the internal therapeutic member may be composed of a fibrous foam insole. In other embodiments, the internal therapeutic member may directly deliver medicament and/or provide cold treatment or hot treatment therapies to the paw, while providing cushioning, shock absorption and protection from dirt and debris. Depending on the treatment needed, the internal therapeutic member is appointed to be removabley housed within the external boot member so that it can be interchanged and/or adjusted.

The gel bootee (and/or optional bootee insole) and/or the massaging gel insole are composed of a gel material that enhances comfort as well as provides support for the pet's paw, legs, and lower back. Massaging gel structures are utilized so that when the animal walks a massaging effect is created on the paw to promote blood circulation and increase the overall health and comfort of the pet. The gel bootee (and/or optional bootee insole) and/or the massaging gel insole is composed of a silicon or polymeric material preferably having a movable fluid paw bed/foot bed or a viscoelastic gel to provide shock absorption and consequently protection to the paw. An absorbent top cloth may be adhered to the upper surface of gel bootee (and/or optional bootee insole) and/or the massaging gel insole to absorb moisture from the paw and enhance comfort. The absorbent top cloth may be resilient foam that conforms to the paw pad of the pet when pressure is applied.

Figure 1A:
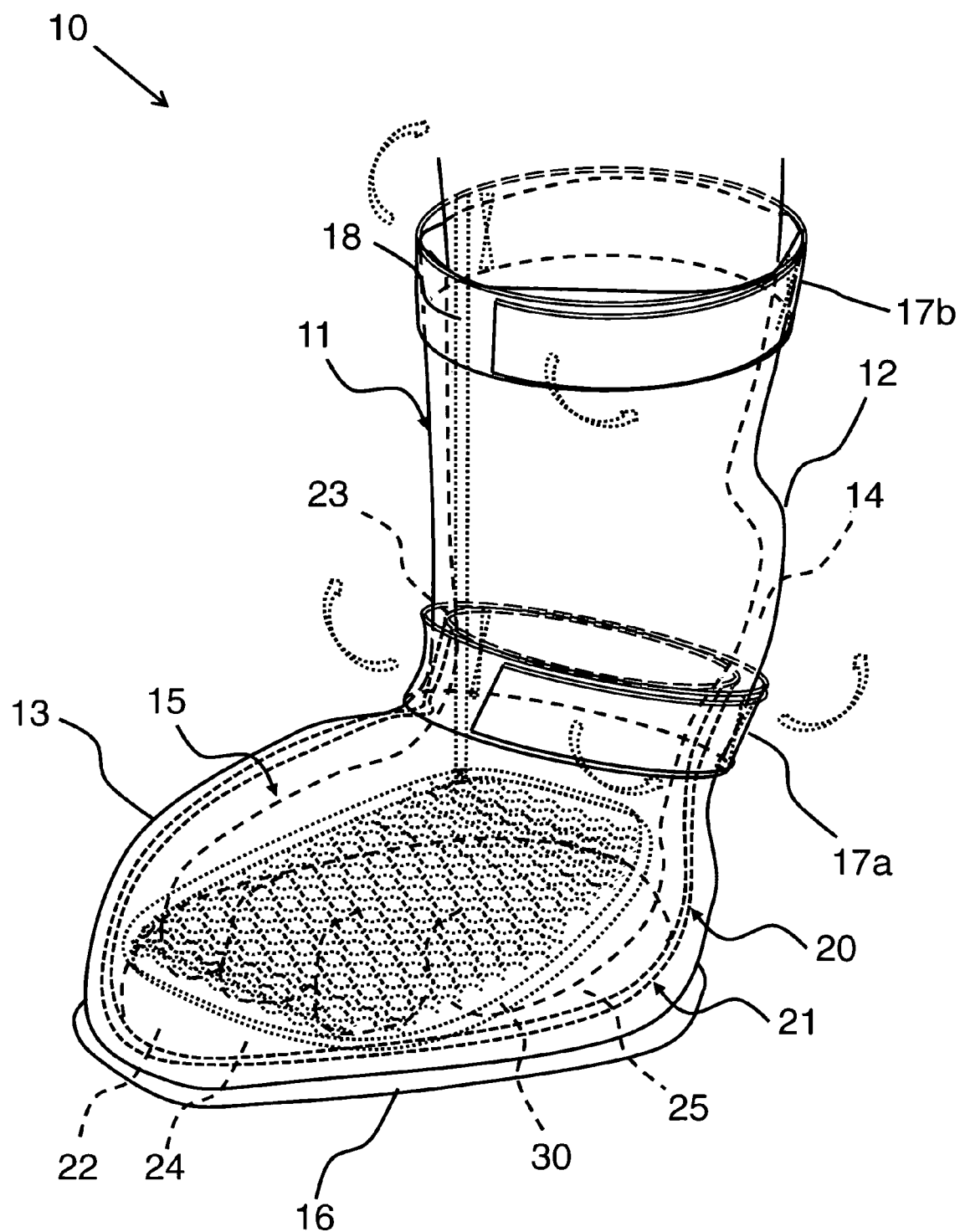
FIG. 1a is a schematic view of an embodiment of the therapeutic pet boot wherein the internal gel member is constructed as a gel bootee having a gel bootee insole.
Figure 1B:
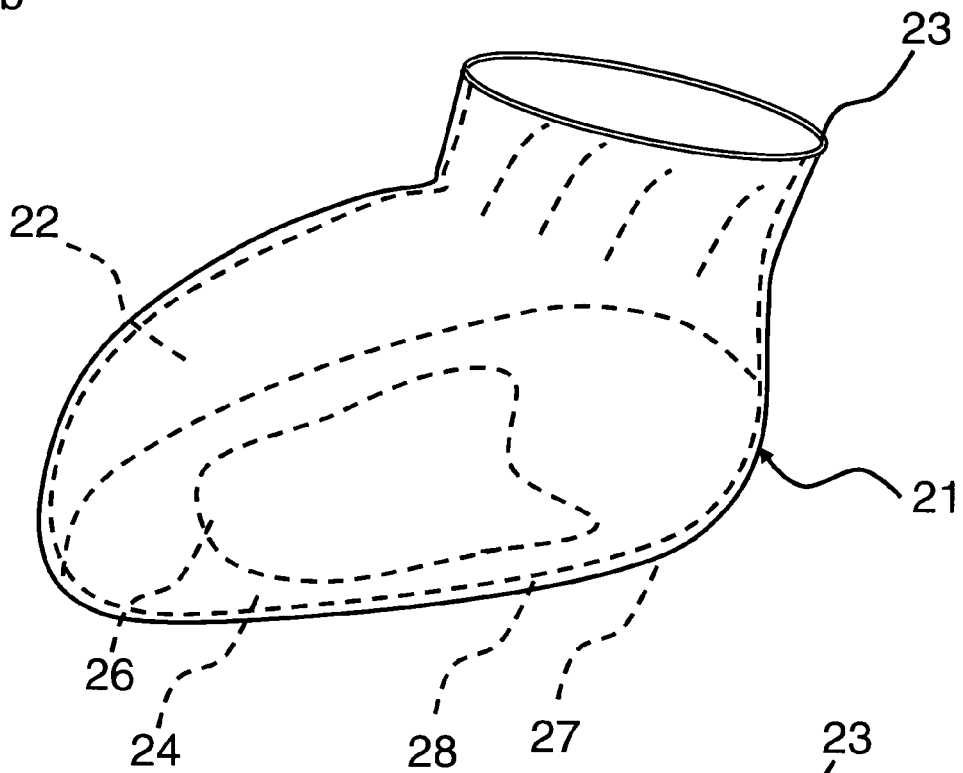
FIG. 1b is a view of the gel bootee shown without the gel bootee insole insert.
Figure 1C:
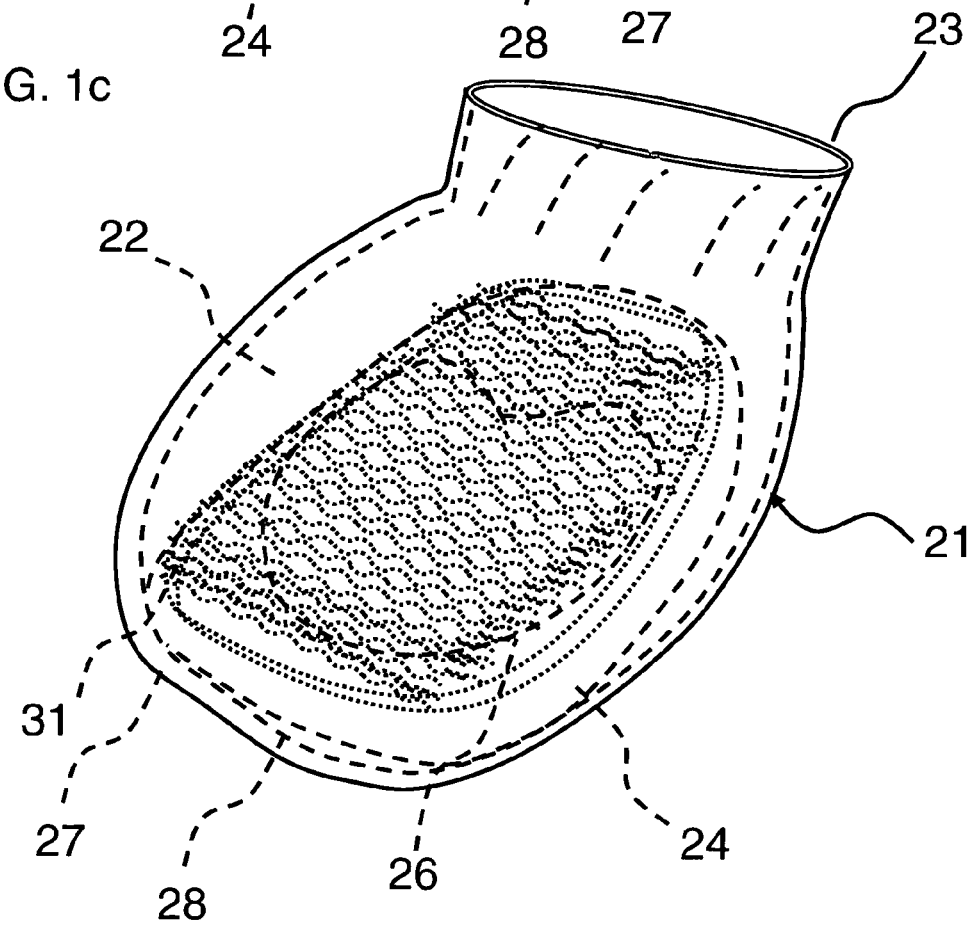
FIG. 1c is a view of the gel bootee shown with the gel bootee insole inserted therein.

FIGS. 1a-1c illustrate a first embodiment of the therapeutic pet boot, shown generally at 10. The therapeutic pet boot 10 comprises an external boot member 11 having a shaft 12 and a paw portion 13 constructed to form a cavity 14 integrated therein and being appointed to receive an injured paw 15 of a pet. External boot member 11 may include an outsole 16 comprising carbon rubber or blown rubber for a softer outsole. Preferably, shaft 12 and at least a portion of the paw portion 13 of the external boot member 11 includes an elongated slit 18 for access and entry into cavity 14. At least one securing member 17 may be provided to secure the therapeutic pet boot 10 to the pet during wear, preferably at the ankle area as shown by 17a, however, a second securing member 17b may be provided above the ankle area as shown via 17b to provide a snug fit against the leg of the animal so that the animal does not chew on the external boot member 11 and the external boot member 11 remains closed and snug against the leg of the animal. Securing members 17a, 17b preferably are circumferential straps with fastening means integrated therein that engage to secure the external boot member 11 in a closed configuration as shown. Fastening means preferably include hook and loop fastening mechanisms, such as that sold under the trade name VELCRO. Alternatively, mating fastening means may be provided along a substantial portion of the length of slit 18 for closure of external boot member 11, such as hook and loop fasteners commonly sold under the trade name VELCRO.

An internal therapeutic member 20 is located within paw portion 13 of therapeutic pet boot 10. In the embodiment shown herein, internal therapeutic member 20 comprises a gel bootee 21. Gel bootee 21 is constructed having a boot-like shape having a paw cavity 22 having an insole area 24 and an upper rim 23 essentially coming in contact with the pet's ankle area or above the paw 15. Preferably, the gel bootee is removable from the external boot member 11. Gel bootee 21 may be worn by the pet without the outer external boot member 11 when inside a house or outside when the weather and terrain permit. What is more, removability of gel bootee 21 from the external boot member 11 allows gel bootee 21 to readily be replaced with a new bootee 21 when the bootee is spent and its integrity is compromised or a different treatment is needed.

Gel bootee 21 is composed of a gel material that enhances comfort as well as provides support for the pet's paw, legs, and lower back. Preferably, gel bootee 21 is constructed as a massaging gel so that when the animal walks a massaging effect is created on the paw. The gel bootee 21 promotes blood circulation within the paw thereby increasing the overall health and comfort of the pet. Gel bootee 21 may be formed so that the bootee paw insole area 24 is composed of a silicon or polymeric material including a movable fluid or a viscoelastic gel to provide shock absorption and consequently protection to the paw. An absorbent top cloth 25 may be adhered to the upper surface of the paw bed 24 of gel bootee 21. Alternatively, bootee 21 may further include a bootee gel insole 30 which may be integrated within the construct of the bootee 21 or (more preferably) is removable therefrom for replacement and/or for varying treatment.

FIGS. 1b and 1c illustrate the gel bootee 21 shown removed from external boot member 11 of FIG. 1a. In particular, FIG. 1b shows the gel bootee 21 by itself without the bootee gel insole 30, while FIG. 1c shows gel bootee 21 with the optional bootee gel insole 30 inserted therein. Bootee gel insole 30 may be integrated within gel bootee 21 and therefore non-removable from gel bootee 21. Paw cavity 22 of gel bootee 21 is preferably formed having a bottom gel layer 27 and a top gel layer 28 secured by adhesive, RF welding, or any other appropriate means. Gel bootee 21 and visa vie bottom gel layer 27 and top gel layer 28, as well as upper rim 23 of bootee 21 are preferably composed of a fluid impermeable material.

During construction, preferably by injection molding bottom gel layer 27 is selected and formed in the shape of the bootee 21 having upper rim 23, paw cavity 22 and bottom insole area 24. A top gel layer 28 is also formed into the shape of bootee 21 via injection molding forming the upper rim 23, paw cavity 22 as well as bottom insole area 24. Top gel layer 28 may be formed as only a bottom insole area 24 to be inserted onto the bottom insole area 24 of the bottom gel layer 27. Top gel layer 28 is inserted within bottom gel layer 27 and bonded at upper rim 23, and preferably at least a portion of paw cavity 22 includes bonding areas. Bonding may be achieved by an adhesive, RF welding, or any other appropriate means.

The gel layers, 27 and 28, are preferably made from a non-foam elastomer such as the class of materials known as viscoelastic polymers or silicone gels, which show high levels of damping when tested by dynamic mechanical analysis performed in the range of −50° C. to 100° C. Mechanical properties of the gel have greater viscous than elastic and therefore the gel provides a high energy absorption. Gels that can be used according to the present invention are thermoplastic elastomers (elastomeric materials), such as materials made from many polymeric families, including but not limited to the Kraton family of styrene-olefin-rubber block copolymers, thermoplastic polyurethanes, thermoplastic poly olefins, polyamides, polyureas, polyesters and other polymer materials that reversibly soften as a function of temperature. The preferred elastomer is a Kraton block copolymer of styrene/ethylene-co-butylene/styrene or styrene/butadiene/styrene with mineral oil incorporated into the matrix as a plasticizer. Bootee 21 may include a paw pad 26 that is slightly concave to enhance massage and contact on the paw pad of the animal. Concave digital pads may also be provided for the smaller paw pads on the animals paw.

Bootee gel insole 30 may be inserted within gel bootee 21 when needed, or may be integrated therein during construction of gel bootee 21. Removability of bootee gel insole 30 not only allows the insole 30 to be replaced after use or when dirtied, but also allows for different treatment options as needed. For example, although bootee gel insole 30 is shown herein with messaging wave patterns, bootee gel insole 30 may be provided as a resilient gel cushioning, air cushioning, or as a cold/warm insole insert or as a medicament releasing insole as discussed hereinafter in regards to FIGS. 5-10. Where the insole 30 is integrated within bootee 21, the insole 30 is preferably either formed and bonded to top gel layer 28 or is integrated within the formation of the top gel layer 28. Bootee gel insole 30 is herein shown having spring walls 31 constructed therein for massaging the paw 15 while walking. As best illustrated in FIGS. 3a, 3b and 4a, 4b these spring walls are parallel, spaced apart, sinusoidal shaped wave patterns. Spacing of approximately 3 mm between adjacent rows is provided, but same may vary.

Figure 2:
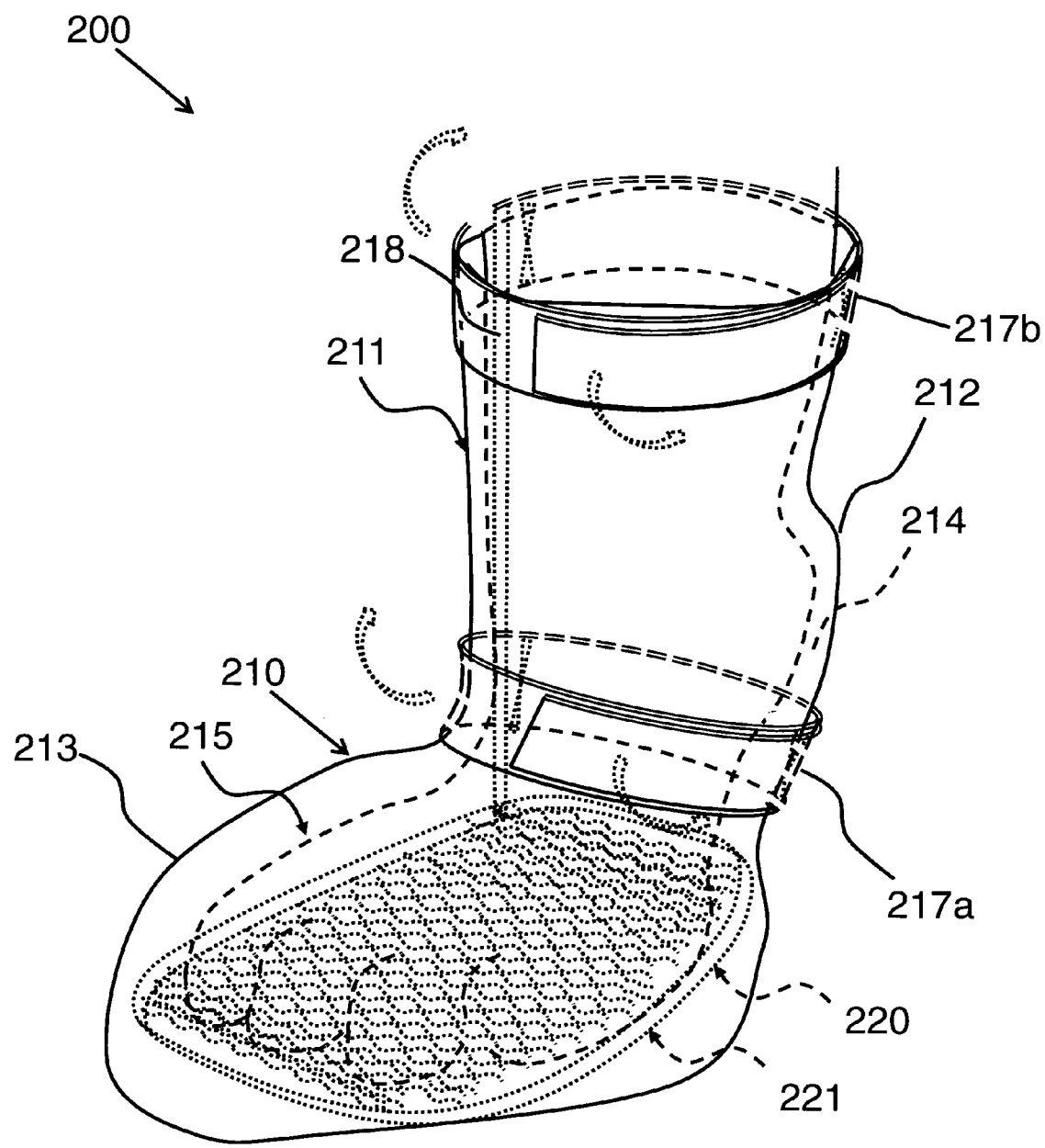
FIG. 2 is a schematic view of an embodiment of the therapeutic pet boot wherein the internal gel member is constructed as a massaging gel insole.

FIG. 2 is a schematic view of an embodiment of the therapeutic pet boot wherein the internal gel member is constructed as a massaging gel insole rather than a bootee as shown in FIG. 1a-1c, shown generally at 200. In this embodiment an internal therapeutic member 220 is provided as a massaging gel insole 221. Therapeutic pet boot 210 comprising an external boot member 211 having a shaft 212 and a paw portion 213 constructed to form a cavity 214 appointed to receive an injured paw 215 which comes into intimate contact with the massaging gel insole 221. The massaging gel insole 221 is constructed in varying embodiments as discussed hereinafter in reference to FIGS. 3-10. Preferably, massaging gel insole 221 is removable from external boot member 211 to allow massaging gel insole 221 to readily be replaced. Shaft 212 and at least a portion of the paw portion 213 of the external boot member 211 includes an elongated slit 218 for access and entry into cavity 214. At least one securing member 217 may be provided to secure the therapeutic pet boot 210 to the pet during wear, preferably at the ankle area as shown by 217a, however, a second securing member 217b may be provided above the ankle area.

Figure 3A:
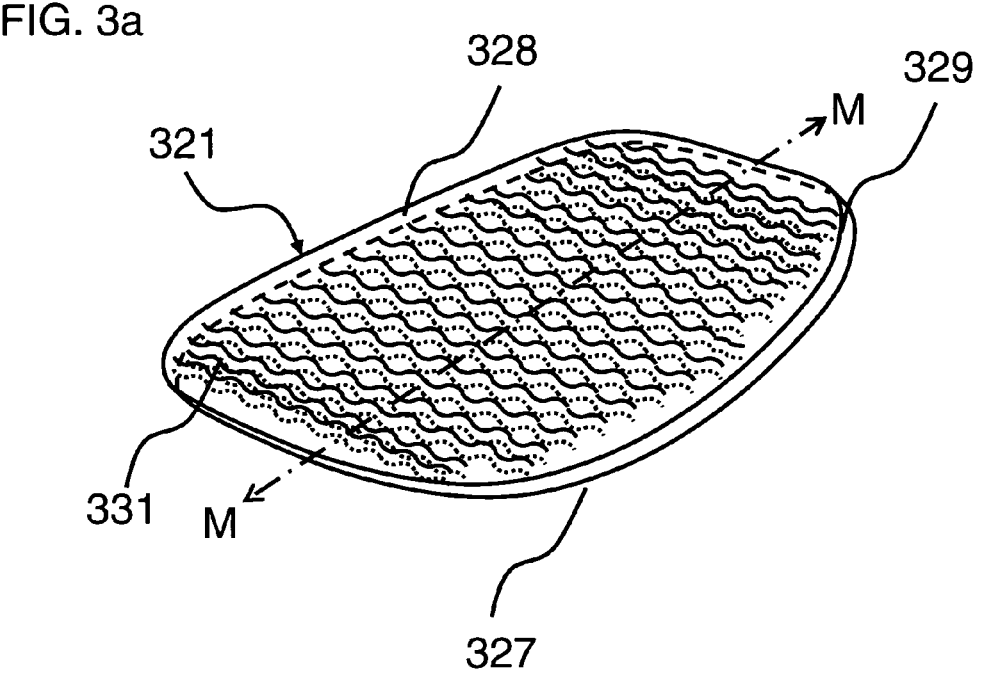
FIG. 3a is a top view of an embodiment of the bootee insole and/or the massaging gel insole.
Figure 3B:
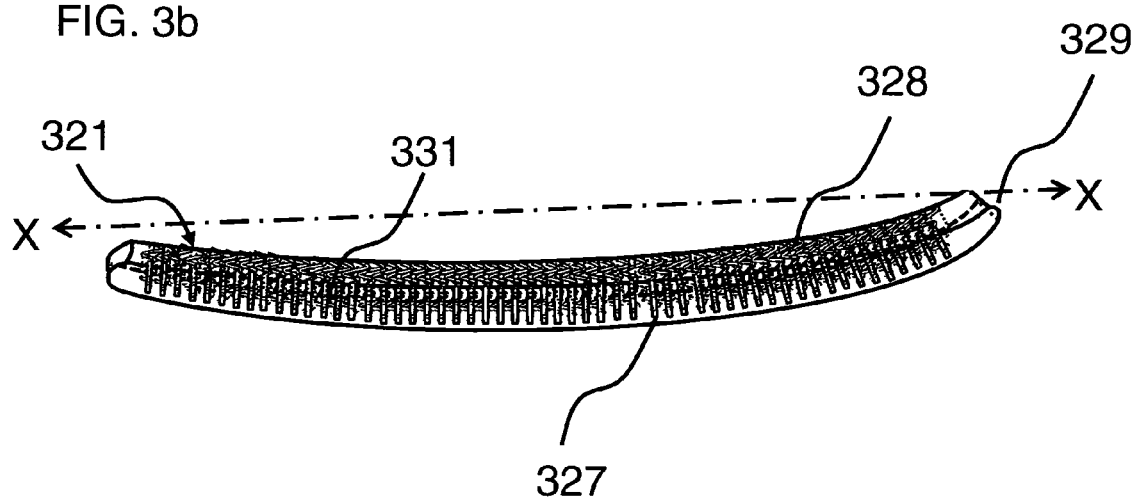
FIG. 3b is a cross-sectional view of the patch of FIG. 3a taken along line M-M.
Figure 4A:
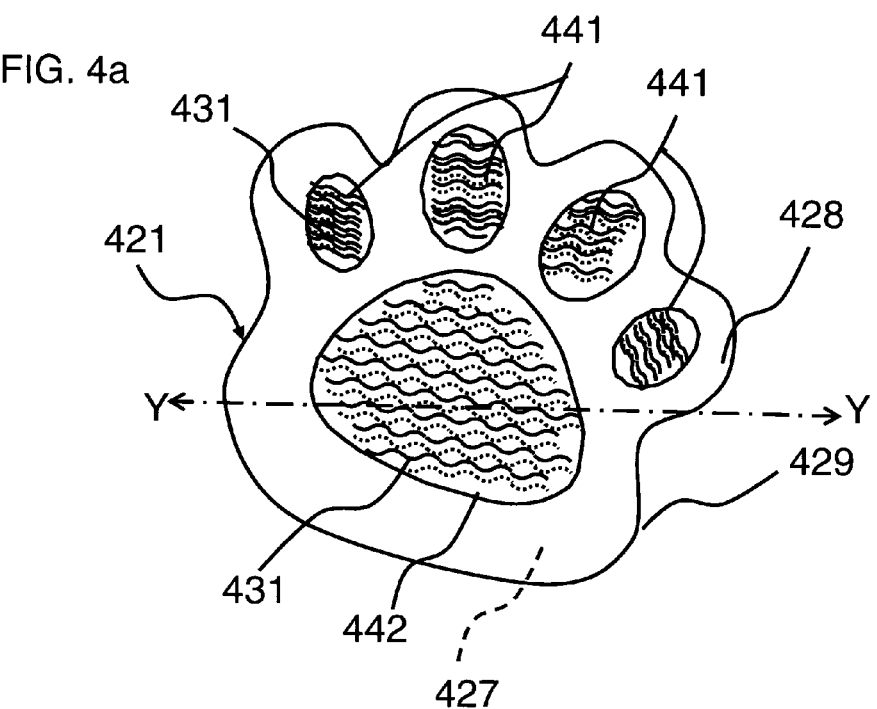
FIG. 4a is a top view of an embodiment of the bootee insole and/or the massaging gel insole wherein the insole is shaped and conformed to massage the paw pad.
Figure 4B:
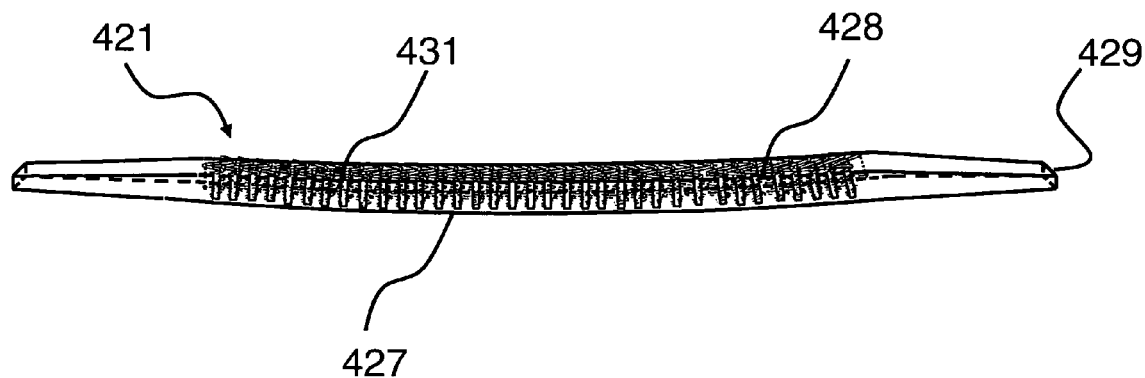
FIG. 4b is a cross-sectional view of the patch of FIG. 4a taken along line Y-Y.

Bootee 21 and/bootee gel insole 30 of FIG. 1c and/or massaging gel insole 221 of FIG. 2 may be constructed having spring walls constructed therein for massaging the paw. As best illustrated in FIGS. 3a, 3b and 4a, 4b, these spring walls are parallel, spaced apart, sinusoidal shaped wave patterns. Spacing of approximately 3 mm between adjacent rows is provided, but same may vary. FIG. 3a shows a top view of bootee gel insole 30 of FIG. 1c or massaging gel insole 221, FIG. 2 shows a cross-sectional view of FIG. 3a taken along M-M. Of relevance, FIGS. 4a and 4b is a top view and cross-section view taken along Y-Y, respectfully, of an embodiment of the bootee gel insole and/or the massaging gel insole wherein the insole is shaped and conformed specifically to focus massage to the paw pad, including the digital pads and metacarpal pad. Alternatively, the insole may be readily cut or shaped to fit the size of a dog's/cat's paw.

Referring generally to FIGS. 3a, 3b, 4a and 4b, an insole 321, 421 is shown which may be appointed as a bootee gel insole for insertion into a gel bootee as herein described in FIGS. 1b and 1c, or as a massaging gel insole as herein described in FIG. 2. A silicon or polymeric material including a movable fluid or a visco-elastic gel may be used to construct the insole 321, 421. Gel insole 321, 421 is preferably formed having a bottom/base gel layer 327, 427 and an upper/top gel layer 328, 428 secured by adhesive, RF welding, or any other appropriate means at sides 329, 429. The layers 327, 328 (427, 428) are preferably made from a non-foam elastomer such as the class of materials known as viscoelastic polymers or silicone gels. Thermoplastic elastomers (elastomeric materials), such as materials made from many polymeric families, including but not limited to the Kraton family of styrene-olefin-rubber block copolymers, thermoplastic polyurethanes, thermoplastic poly olefins, polyamides, polyureas, polyesters and other polymer materials that reversibly soften as a function of temperature may be used. The preferred elastomer is a Kraton block copolymer of styrene/ethylene-co-butylene/styrene or styrene/butadiene/styrene with mineral oil incorporated into the matrix as a plasticizer.

During construction, preferably by injection molding bottom/base gel layer 327, 427 is selected and formed in the shape of the insole 321, 421. An upper/top gel layer 328, 428 is also formed into the shape of insole 321, 421 via injection molding and the layers 327 and 328 (427 and 428) are bonded together at sides 329, 429 by an adhesive, RF welding, or any other appropriate means. The bootee gel insole or massaging gel insole 321, 421 may comprise polyurethane surrounding a material selected from a group consisting of gel, liquid silicone, or polyurethane foam, wherein bottom/base gel layer 327, 427 and upper/top gel layer 328, 428 are constructed as polyurethane and bonded on sides 329, 429.

In the embodiment shown, the insole 321, 421 includes spring walls 331, 431 for massaging the paw. Preferably, these spring walls 331, 431 are parallel, spaced apart, sinusoidal shaped wave patterns. Spacing of approximately 3 mm between adjacent rows is provided, but same may vary based on the size of the insole 321, 421. The insole 321, 421 may have a slightly arced configuration as shown by way of line x-x in FIG. 3b for comfortably slightly embracing the paw pad of the paw of the animal. As shown in FIG. 4a, the insole 421 may be constructed having digital pads 441 and a metacarpal pad 442 which each may include massaging characteristics (herein shown as sinusoidal shaped spring waves 431), or alternatively the whole paw-shaped pad of FIG. 4a may have massaging characteristics. In formation of the spring walls 331,431 same is preferably formed by molding or pressing same in the bottom/base layer 327, 427 and top/upper layer 328, 428 after same are bonded together via molding of sinusoidal shaped wave press.

Parallel, spaced apart, wave pattern resilient walls may be formed within the gel bootee (and/or optional bootee insole) and/or the massaging gel insole. These resilient walls are spaced by sinusoidal grooves to from wave patterns on the paw bed or foot bed of the bootee or insole. Spacing between adjacent resilient walls may vary, and for example may be approximately 3 mm, which varies dependent upon the width of each wall, size of the paw pad/insole, and by changing the amplitude of the sinusoidal grooves. Pitch of the wave pattern may also be varied. Various gel insoles are currently sold in the market for human feet, such as those sold under the trade name Dr. Scholl's® (massaging gel insoles and inserts). However, gel insoles for human feet are differently shaped and configured than those for canine and feline paws and up until the time of the present invention herein no gel insole has been constructed or provided for a canine or feline paw. Uniquely, the subject invention herein addresses problems resultant from paw injury to canines and felines (as well as other pawed pets) and has found that use of the therapeutic pet boot herein facilitates healing through massaging gel action during recovery.

The gel bootee insole and/or massaging gel insole is constructed so that when the animal walks a massaging effect is created on the paw. Blood circulation is promoted within the paw thereby increasing the overall health and comfort of the pet. The insoles may be formed in the shape of a paw including a paw pad and toe paw pad regions as show in 4a for example, or may have a general shape that may be subject to trimming with scissors.

Figure 5:
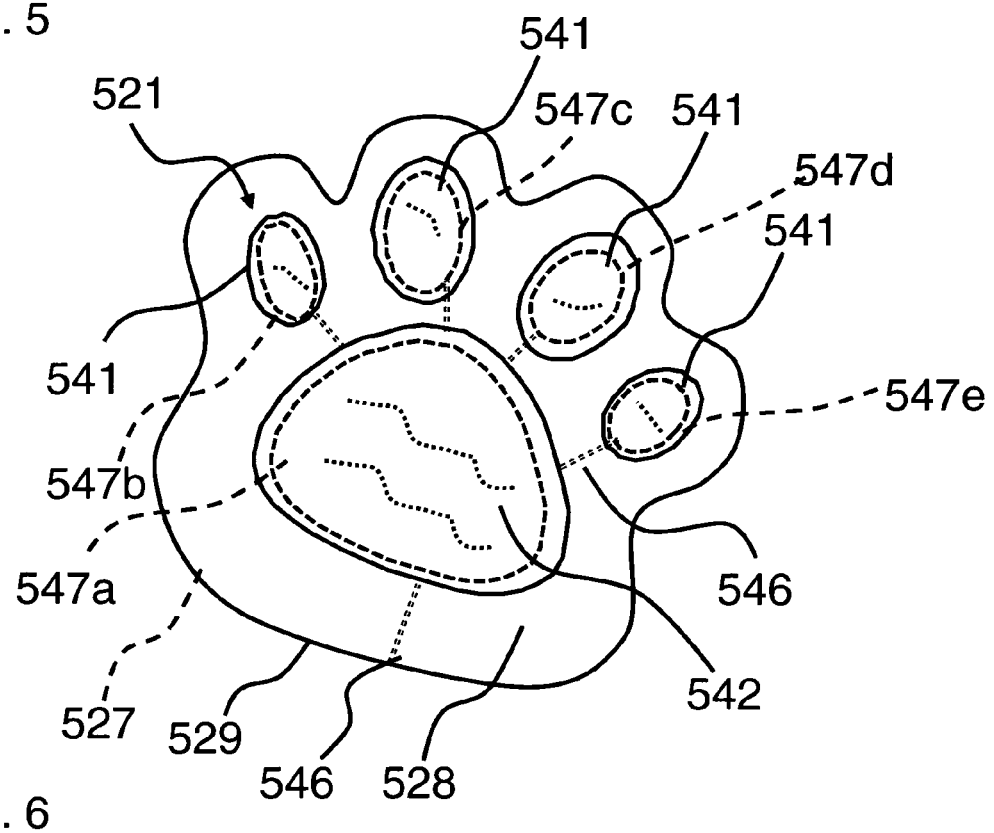
FIG. 5 is a top view of an embodiment of the bootee insole and/or the massaging gel insole shaped and conformed to massage the paw pad and include massaging gel reservoirs.
Figure 6:
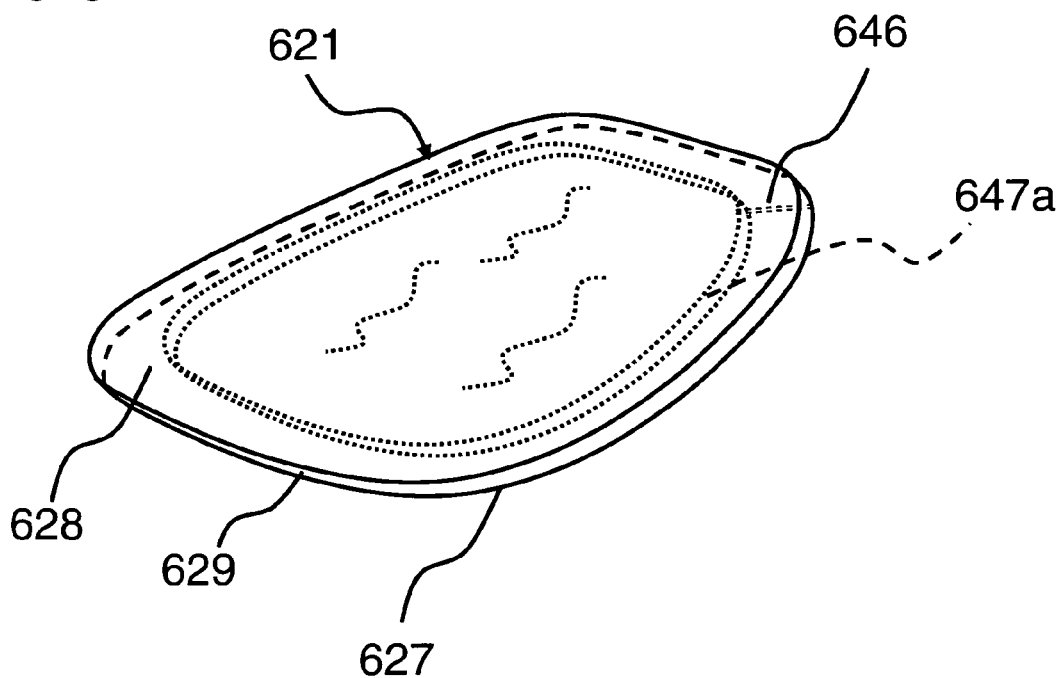
FIG. 6 is a top view of an embodiment of the bootee insole and/or the massaging gel insole includes massaging gel reservoirs.

FIG. 5 is a top view of an embodiment of the bootee insole and/or the massaging gel insole shaped and conformed to massage the paw pad and include massaging gel reservoirs/or air cushioning reservoirs. FIG. 6 is a top view of an embodiment of the bootee insole and/or the massaging gel insole shaped in a polygonal shape and includes massaging gel reservoirs. Any shaped insole having a size and construct which fits within the external boot member and/or gel bootee may be utilized. Insole 521, 621 may be readily cut or shaped to fit the size of a dog's/cat's particular paw and is preferably made from a silicon or polymeric material including a movable fluid or a visco-elastic gel used to construct insole 521, 621. Gel insole 521, 621 is preferably formed having a bottom/base gel layer 527, 627 and an upper/top gel layer 528, 628 secured by adhesive, RF welding, or any other appropriate means at sides 529, 629 and/or between digital pads 541 and metacarpal pad 542. Layers 527, 528 (627, 628) may comprise polyurethane surrounding a material selected from a group consisting of gel, liquid silicone, or polyurethane foam, or air pockets/a plurality of capsules of compressed air wherein bottom/base gel layer 527, 627 and upper/top gel layer 528, 628 are constructed as polyurethane and bonded on sides 529, 629. As shown in FIG. 5, each digital pad 541 and metacarpal pad 542 may include massaging characteristics as shown; or the entire pad may be constructed with a massaging reservoir or pocket such as shown in 6, which may be shaped as a polygon or may be shaped as a paw. In formation, layers 527, 627 and 528, 628 are bonded together save for injection ports 546, 646 from which gel, liquid silicone, polyurethane foam, water, or air are injected into reservoirs 547a-n, 647a-n after which time injection ports 546, 646 are closed and sealed via bonding/adhesive. The insoles can be made from other methods concerning the formation of gel insoles and are not limited to the method herein.

Alternatively, the insole is appointed to provide cold therapy to the paw. Preferably, cold therapy is achieved by way of the gel insole being capable of being placed in a refrigerator or freezer to provide a cold insole or bootee for treatment of the injured paw. The gel insoles are constructed having a polymeric top and bottom layer adhered together to form a reservoir or pocket therein which receives and houses a non-toxic material, preferably hydroxyethyl cellulose (sold under the trade name Cellusize™) or vinyl-coated silica gel or a granular, vitreous, highly porous form of silica made synthetically from sodium silicate. Another type of gel insole ice pack which may be used concerns cold treatment resultant from an endothermic reaction of ammonium nitrate and water for quick cooling. Cold treatment is achieved by way of an endothermic reaction, such as when water is in a reservoir of the gel insole along with a small plastic bag or tube containing ammonium-nitrate, so that when the bag or tube is broken, the water mixes with the fertilizer to create an endothermic reaction yielding a temperature of approximately 35 F for 10 to 15 minutes. Other chemicals which produce a similar effect include calcium chloride and ammonium chloride. The refrigerator and/freezer cold insole is more preferable for regular use than the chemical reaction cold treatment insole herein disclosed chiefly due to safety concerns. However, chemical cold gel insoles can be used in limited circumstances such as when a pet needs quick cold treatment. Formation of the insole is achieved in a similar method as described in reference to FIGS. 6 and 7, with the exception that the liquid or gel injected into each of the reservoirs 547a-n, 647a-n include the non-toxic material, preferably hydroxyethyl cellulose (sold under the trade name Cellusize™) or vinyl-coated silica gel or a granular, vitreous, highly porous form of silica made synthetically from sodium silicate, or insertion of ammonium nitrate and water within metacarpal pad 542 for quick endothermic cooling.

Warm/hot treatment may be provided by the therapeutic pet boot as well via insole or a massaging gel insole that is appointed to provide warm therapy to the paw. Preferably, warm therapy is achieved by way of the insole or massaging gel insole via a hot water bottle type warming gel insole or chemical heat insole pack. Preferably, hot water bottle type insoles are used where the insole is reusable and where safety is a concern. The insoles utilize the insole construction but further include a small reservoir therein containing a material having a high specific heat capacity, which then gradually releases the heat over time, such as water. Chemical pads may be employed in the constructs of the insole via employing a chemical heat reservoir or a one-time chemical reaction such as catalyzed rusting of iron. A sodium acetate heat pad may be provided within the insole provided as a reusable heat reservoir. It contains a supersaturated solution of sodium acetate ($NaCH_3COO$). Crystallization is triggered by flexing a small flat disc of notched ferrous metal embedded in the liquid. Pressing the disc releases very tiny adhered crystals of sodium acetate into the solution which then act as nucleation sites for the recrystallization of the remainder of the salt solution. Because the liquid is supersaturated, the solution crystallizes rapidly thereby releasing the energy of the crystal lattice. The insole can be reused by placing it in boiling water for 10-15 minutes, which re-dissolves the sodium acetate in the contained water and recreates a supersaturated solution. Once the pad has returned to room temperature it can be triggered again. Preferably, at least a portion of the gel bootee or paw portion of said external boot member includes an insulating layer to insulate the heat of the warm/heated insole. Formation of the insole is achieved in a similar method as described in reference to FIGS. 6 and 7, with the exception that the liquid or gel injected into each of the reservoirs 547*a-n*, 647*a-n* include the high specific heat capacity, which then gradually releases the heat over time, such as water, wherein the insole is appointed to be heated in hot water/on low in the microwave. Chemical pads may be employed in the constructs of the insole via employing a chemical heat reservoir or a one-time chemical reaction such as catalyzed rusting of iron via generally by inserting a supersaturated solution of sodium acetate ($NaCH_3COO$) into each of the reservoirs 547*a-n*, 647*a-n* and then allowing same to cool to room temperature for use.

Figure 7:
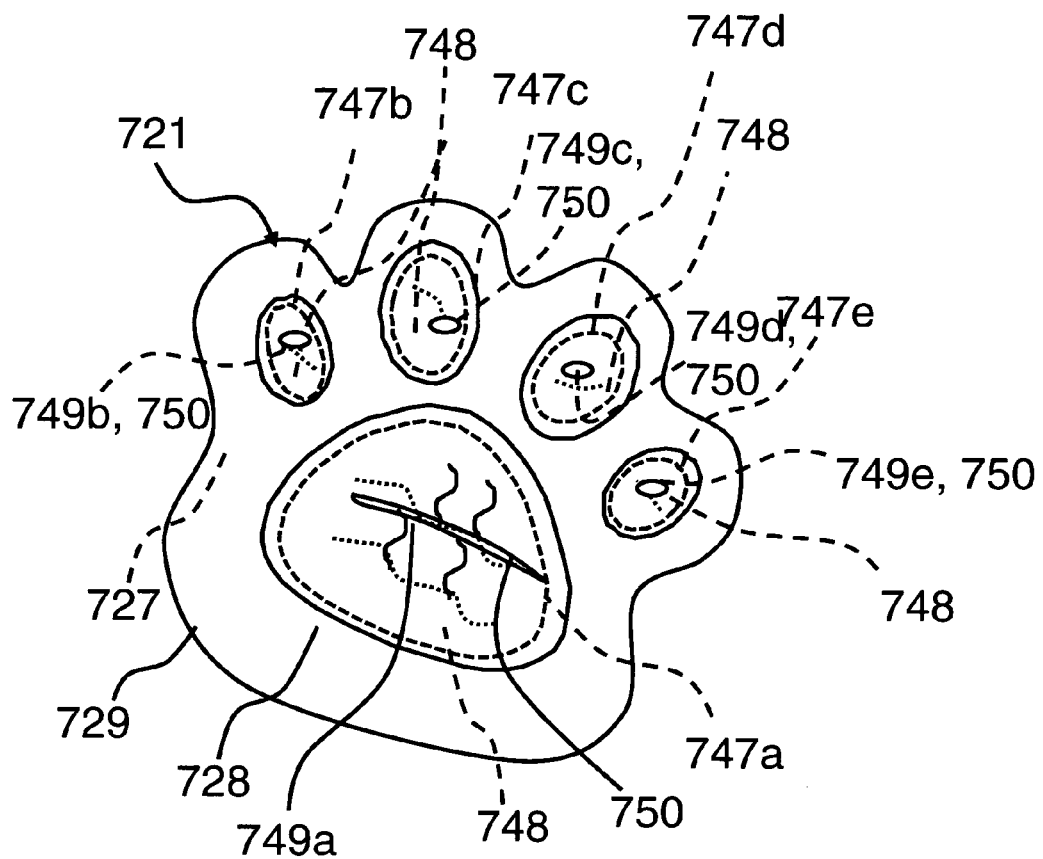
FIG. 7 is a top view of an embodiment of the bootee insole and/or the massaging gel insole shaped and conformed to massage the paw pad and include medicament releasing pocket.
Figure 8:
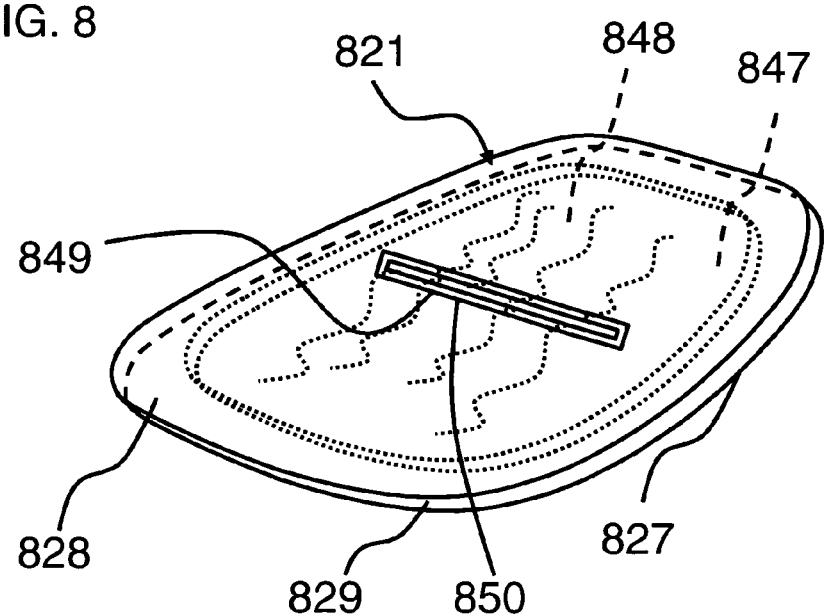
FIG. 8 is a top view of an embodiment of the bootee insole and/or the massaging gel insole includes a medicament releasing pocket.

FIG. 7 is a top view of an embodiment of the bootee insole and/or the massaging gel insole shaped and conformed to massage the paw pad and include medicament releasing pocket. FIG. 8 is a top view of an embodiment of the bootee insole and/or the massaging gel insole including a medicament releasing pocket. Gel insole 721, 821 comprises at least one insole pocket/reservoir 747*a-n*, 847*a-n* appointed to house medication 748, 848 therein which is secreted through at least one aperture 749*a-n*, 849*a-n* to the injured paw. Aperture 749*a-n*, 849*a-n* includes a breakable polymeric cover or thin membrane 750, 850 that readily ruptures when force in the form of the animal's weight is applied to the insole 721, 821.

Formation of the insole 721, 821 is achieved in a similar method as described in reference to FIGS. 6 and 7, with the exception that the liquid or gel injected into each of the reservoirs 747*a-n*, 847*a-n* is that of the medicament, ointment, lotion, or antiseptic, etc. Medicament can be directly delivered to the paw through use of the insole 721, 821. Such medication 748, 848 can include a plethora of medicines or treatments, for example including anesthetizing substances, antiseptic or an ointment, or may include a lotion or oil for treatment of cracked or dry pads. Advantageously, topical delivery of the medicament or ointment is achieved in a manner wherein the dog or cat cannot lick the product. The reservoirs 747*a-n*, 847*a-n* housing the anesthetizing substances, antiseptic, ointment, or lotion, etc., may be a single reservoir or may be comprised of a plurality of reservoirs in the form of a plurality of pockets or a plurality of capsules as shown in FIGS. 9 and 10—that readily release the medicament, etc. to the paw as pressure is applied.

The medicament, etc. may be released by the application of pressure to the external surface or external top layer 728, 828 of the insole 721, 821. This application of pressure causes the reservoir 747*a-n*, 847*a-n*, pockets or capsules to break, releasing the medicament, lotion, etc., housed therein (748, 848). Due to the arrangement of the pockets/reservoir 747*a-n*, 847*a-n* within the insole 721, 821, the medicament 748, 848, etc. is released at the interface between the paw pad and top of the insole 721, 821 enabling the medicament to contact the paw. The overall volume of the pockets or reservoir 747*a-n*, 847*a-n* determines the amount of the medicament or topical treatment available. Once released, the medicament or topical treatment is spread to an area at the paw-contact interface. The pockets/reservoir 747*a-n*, 847*a-n* may be spaced apart, and the size of the pockets may be provided dependent on the amount of medicament or topical treatment to be dispersed and the size of the insole.

Figure 9:
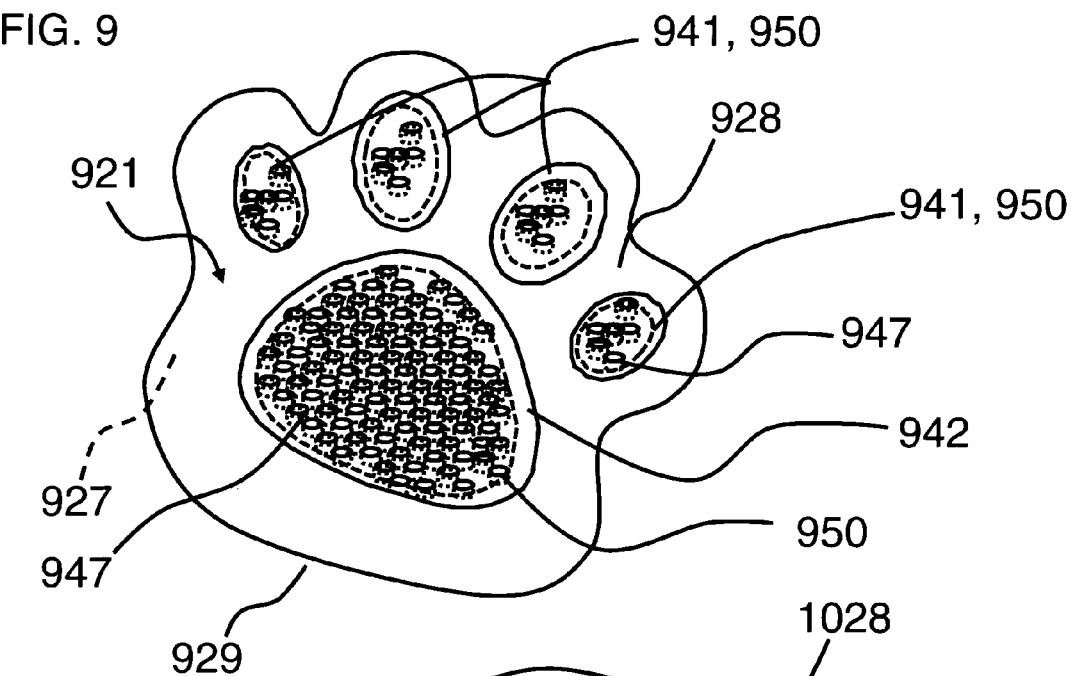
FIG. 9 is a top view of an embodiment of the bootee insole and/or the massaging gel insole shaped and conformed to massage the paw pad and include a plurality of medicament releasing pockets.
Figure 10A:
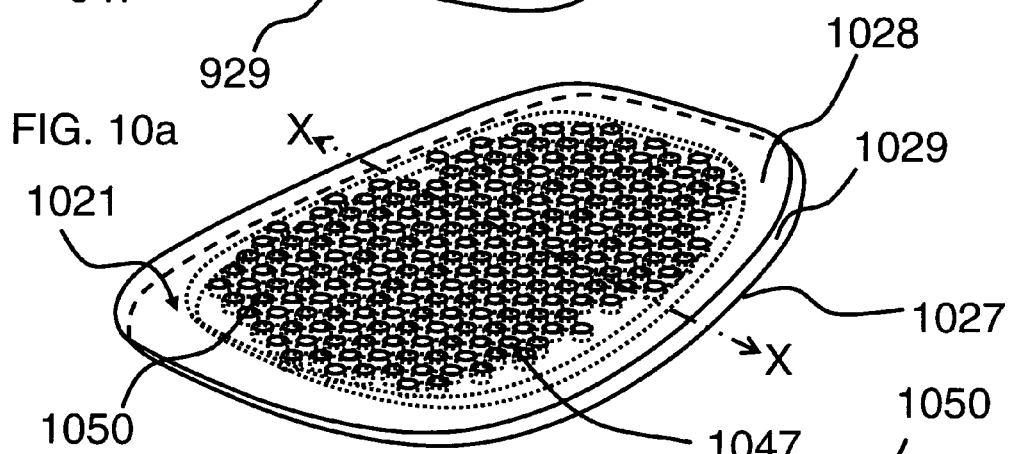
FIG. 10a is a top view of an embodiment of the bootee insole and/or the massaging gel insole includes a plurality of medicament releasing pockets.
Figure 10B:
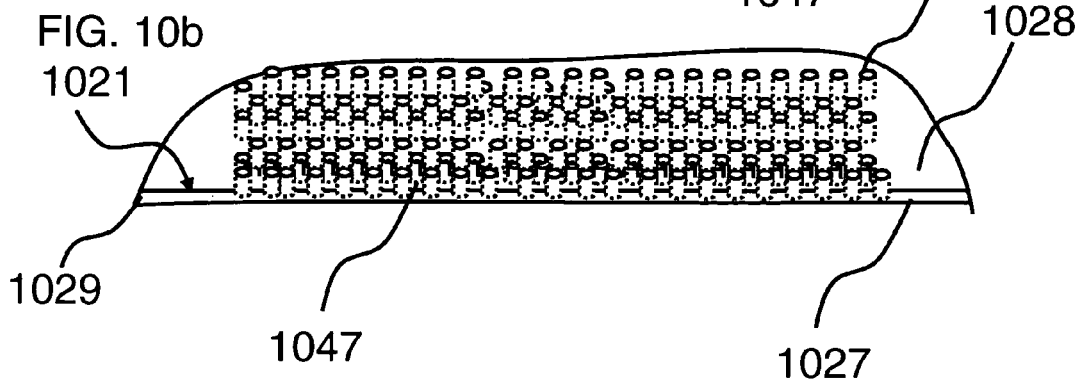

The medicament or topical treatment may be contained in a plurality of small pockets within the insole as shown in FIGS. 9-10. FIG. 9 is a top view of an embodiment of the bootee insole and/or the massaging gel insole shaped and conformed to massage the paw pad and include a plurality of medicament releasing pockets; FIG. 10*a* is a top view of an embodiment of the bootee insole and/or the massaging gel insole includes a plurality of medicament releasing pockets; FIG. 10*b* is a cross-sectional view taken along line X-X in FIG. 10*a*.

In this embodiment, the medicament or topical treatment is contained in capsules/pockets or reservoirs 947*a-n*, 1047*a-n* constructed within the insole 921, 1021. Insole 921, 1021 is preferably formed having a bottom/base gel layer 927, 1027 and an upper/top gel layer 928, 1028 secured by adhesive, RF welding, or any other appropriate means at sides 929, 1029 and/or between digital pads 941 and metacarpal pad 942 of FIG. 9. Layers 927, 928 (1027, 1028) may comprise polyurethane surrounding a material selected from a group consisting of gel, liquid silicone, or polyurethane foam, or air pockets/a plurality of capsules of compressed air wherein bottom/base gel layer 927, 1027 and upper/top gel layer 928, 1028 are constructed as polyurethane and bonded on sides 929, 1029. Insole 921, 1021 is formed via a bottom/base gel layer 927, 1027 and upper/top gel layer 928, 1028 composed of a fluid impermeable material. The gel layers are preferably made from a non-foam elastomer such as the class of materials known as viscoelastic polymers or silicone gels, which show high levels of damping. Gels that can be used according to the present invention are thermoplastic elastomers (elastomeric materials), such as materials made from many polymeric families, including but not limited to the Kraton family of styrene-olefin-rubber block copolymers, thermoplastic polyurethanes, thermoplastic poly olefins, polyamides, polyureas, polyesters and other polymer materials that reversibly soften as a function of temperature.

In the embodiment shown in FIGS. 9 and 10, the upper/top gel layer 928, 1028 is embossed to create the pockets/reservoirs 947, 1047 and filled with the medicament. The shape of the packets/reservoirs 947, 1047 may be spherical, cylindrical or elongated or any suitable shape. The pockets/reservoirs 947, 1047 may be interconnected to form a continuous single pocket such as an interconnected channel. A thin polymeric sheet 950, 1050 is bonded to the upper/top gel layer 928, 1028 thereby encapsulating the medicament in the pockets/reservoirs 947, 1047 of the upper/top gel layer 928, 1028. The application of pressure to outer surface or exterior top layer of the insole 921, 1021, and visa vie the thin polymeric sheet 950, 1050, breaks the pockets/reservoirs 947, 1047 on the upper/top gel layer 928, 1028 thereby releasing the medicament. Alternatively, a single reservoir is formed which releases the medicament as shown in FIGS. 6 and 7.

Disperse of the medicament is determined by its volume, viscosity and its surface tension. Since pockets contain larger volume of the scent, they can be spaced apart further based on the volume. The volume is generally in the range of 0.01 cc to 0.5 cc and the spacing between the pockets is in the range of 0.01 cm to 0.2 cm. Capsules are generally small and contain only a small quantity of medicament, etc., and can only spread over a small distance approximating a few times the diameter of the microcapsule. These microcapsules may be added to the thin polymeric layer bonded to the top gel layer and are nearly uniformly dispersed. Rather than medication, the reservoirs or pockets may contain a lotion or scent emitting oil having scents such as roses, lavender, chamomile, etc.

Figure 11A:
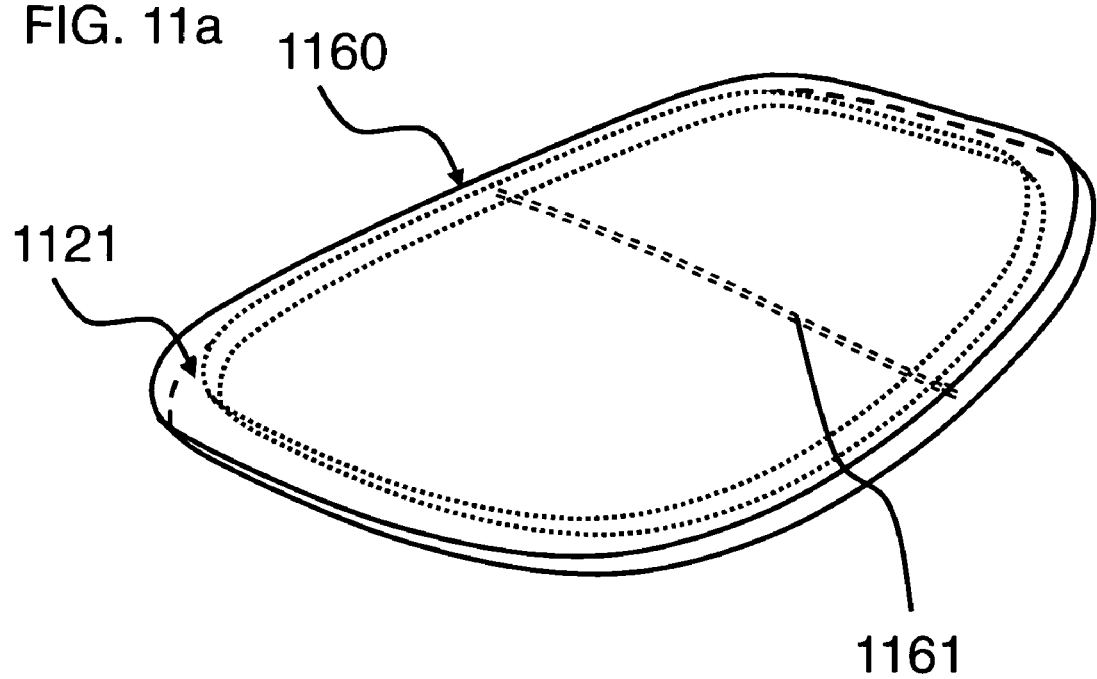
FIG. 11a is a top view of an embodiment of the bootee insole and/or the massaging gel insole removabley housed within a cover.
Figure 11B:
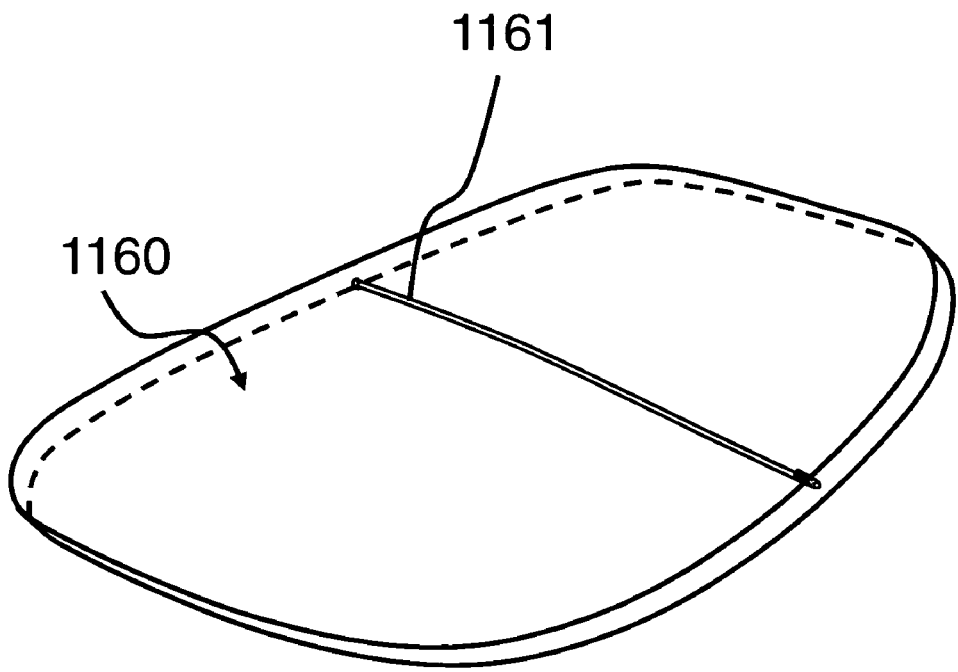
FIG. 11b is a top view of the cover without the insole housed therein.

FIGS. 11*a* and 11*b* show views of a removable cover 1160 which may be used to house bootee gel insole or a messaging gel insole 1121. The covering helps to keep the insole 1121 clean. The removable cover 1160 may be washed and reused. A slit 1161 may be provided for easy removal of insole 1121.

Having thus described the invention in rather full detail, it will be understood that such detail need not be strictly adhered to, but that additional changes and modifications may suggest themselves to one skilled in the art, all falling within the scope of the invention as defined by the subjoined claims.

What is claimed is:

1. A therapeutic pet boot, comprising:
   a. an external boot member having a shaft and a paw portion constructed to form a cavity integrated therein and being appointed to receive an injured paw of a pet;
   b. an internal therapeutic member appointed to be received within said cavity of said external boot member and being appointed to intimately contact said injured paw;
   c. said internal therapeutic member comprises a gel bootee that includes a bootee gel insole; and
   d. said bootee gel insole is removable from said gel bootee, wherein said therapeutic pet boot is appointed to be worn on said injured paw of said pet to facilitate healing.

2. A therapeutic pet boot as recited by claim 1, wherein said external boot includes an outsole comprising carbon rubber or blown rubber for a softer outsole.

3. A therapeutic pet boot as recited by claim 1, wherein said gel bootee is removable from said external boot member.

4. A therapeutic pet boot as recited by claim 1, wherein said bootee gel insole comprises polyurethane surrounding a material selected from a group consisting of gel, liquid silicone, or polyurethane foam.

5. A therapeutic pet boot as recited by claim 1, wherein said bootee gel insole comprises polyurethane surrounding capsules of compressed air.

6. A therapeutic pet boot as recited by claim 1, wherein said bootee gel insole comprises polyurethane surrounding a plurality of capsules of a liquid or gel.

7. A therapeutic pet boot as recited by claim 1, wherein said bootee gel insole is appointed to be placed in a refrigerator or freezer to provide a cold gel insole appointed to be placed within said gel bootee within said external boot member to provide cold treatment to said injured paw.

8. A therapeutic pet boot as recited by claim 1, wherein said bootee gel insole is a heat pad bootee gel insole appointed to deliver heat to said injured paw when inserted within said gel bootee.

9. A therapeutic pet boot as recited by claim 8, wherein at least a portion of said gel bootee includes an insulating layer.

10. A therapeutic pet boot as recited by claim 8, wherein at least a portion of said paw portion of said external boot member includes an insulating layer.

11. A therapeutic pet boot as recited by claim 1, wherein said bootee gel insole comprises an insole pocket appointed to house medication therein which is secreted through at least one aperture to said injured paw.

12. A therapeutic pet boot as recited by claim 1, wherein said bootee gel insole comprises a removable cover.

13. A therapeutic pet boot as recited by claim 1, wherein said shaft and at least a portion of said paw portion of said external boot member includes an elongated slit for access and entry into said cavity.

14. A therapeutic pet boot as recited by claim 1, wherein said internal therapeutic member includes scent emitting properties.

15. A therapeutic pet boot as recited by claim 1, wherein said internal therapeutic member includes a reservoir housing a medicament which releases medicament to said injured paw when pressure is applied to said internal therapeutic member.

16. A therapeutic pet boot as recited by claim 1, wherein said internal therapeutic member includes a plurality of pockets or capsules appointed with at least one aperture that are appointed to release medicament to said injured paw when pressure is applied to said internal therapeutic member.

17. A therapeutic pet boot as recited by claim 1, wherein said internal therapeutic member is appointed to be deliver cold treatment to said injured paw.

18. A therapeutic pet boot as recited by claim 1, wherein said internal therapeutic member is appointed to deliver heat treatment to said injured paw.

19. A therapeutic pet boot as recited by claim 1 comprising a securing member appointed to secure said therapeutic pet boot to said pet during wear.

20. For use in a therapeutic pet boot having a shaft and a paw portion constructed to form a cavity integrated therein and being appointed to receive an injured paw of a pet, an internal therapeutic member comprising:
   a gel bootee having a bootee gel insole, and appointed to be received within said cavity of said external boot member to intimately contact said injured paw and thereby facilitate healing; and
   said bootee gel insole is removable from said gel bootee.

21. A therapeutic pet boot, comprising:
   a. an external boot member having a shaft and a paw portion constructed to form a cavity integrated therein and being appointed to receive an injured paw of a pet;
   b. an internal therapeutic member appointed to be received within said cavity of said external boot member and being appointed to intimately contact said injured paw;
   c. said internal therapeutic member comprises a massaging gel insole; and
   d. said massaging gel insole comprises a removable cover; wherein said therapeutic pet boot is appointed to be worn on said injured paw of said pet to facilitate healing.

22. A therapeutic pet boot as recited by claim 21, wherein said massaging gel insole is removable from within said cavity of said external boot member.

23. A therapeutic pet boot as recited by claim 21, wherein said massaging gel insole comprises polyurethane surrounding a material selected from a group consisting of gel, liquid silicone, or polyurethane foam.

24. A therapeutic pet boot as recited by claim 21, wherein said massaging gel insole comprises polyurethane surrounding capsules of compressed air.

25. A therapeutic pet boot as recited by claim 21, wherein said massaging gel insole is appointed to be placed in a refrigerator or freezer.

26. A therapeutic pet boot as recited by claim 21, wherein said massaging gel insole is a heat insole appointed to deliver heat to said injured paw when inserted within said gel bootee.

27. A therapeutic pet boot as recited by claim 21, wherein said massaging gel insole comprises an insole pocket appointed to house medication therein which is secreted through at least one aperture to said injured paw.

28. A therapeutic pet boot, comprising:
   a. an external boot member having a shaft and a paw portion constructed to form a cavity integrated therein and being appointed to receive an injured paw of a pet;
   b. an internal therapeutic member appointed to be received within said cavity of said external boot member and being appointed to intimately contact said injured paw;
   c. said internal therapeutic member comprises a gel bootee that includes a bootee gel insole; and
   d. said bootee gel insole comprises a removable cover; wherein said therapeutic pet boot is appointed to be worn on said injured paw of said pet to facilitate healing.

29. A therapeutic pet boot as recited by claim 28, wherein said bootee gel insole comprises polyurethane surrounding capsules of liquid, gel or compressed air.

30. A therapeutic pet boot as recited by claim 28, wherein said bootee gel insole is appointed to be placed in a refrigerator or freezer to provide a cold gel insole appointed to be placed within said gel bootee within said external boot member to provide cold treatment to said injured paw.

31. A therapeutic pet boot as recited by claim 28, wherein said bootee gel insole is a heat pad bootee gel insole appointed to deliver heat to said injured paw when inserted within said gel bootee.

32. A therapeutic pet boot as recited by claim 28, wherein said bootee gel insole comprises an insole pocket appointed to house medication therein which is secreted through at least one aperture to said injured paw.

* * * * *